US011724710B2

(12) United States Patent
Jiao et al.

(10) Patent No.: US 11,724,710 B2
(45) Date of Patent: Aug. 15, 2023

(54) SYSTEMS AND METHODS FOR IMPLEMENTING A HYBRID CONTROL FOR AN AUTONOMOUS VEHICLE

(71) Applicant: Pony AI Inc., Grand Cayman (KY)

(72) Inventors: Jialin Jiao, South San Francisco, CA (US); Haojun Wang, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 132 days.

(21) Appl. No.: 16/518,638

(22) Filed: Jul. 22, 2019

(65) Prior Publication Data
US 2021/0024079 A1   Jan. 28, 2021

(51) Int. Cl.
*B60W 50/00* (2006.01)
*B60W 50/08* (2020.01)
*G05D 1/00* (2006.01)
*B60W 30/18* (2012.01)
*B60W 40/08* (2012.01)
*G06Q 20/10* (2012.01)

(52) U.S. Cl.
CPC ............ *B60W 50/08* (2013.01); *B60W 30/18* (2013.01); *B60W 40/08* (2013.01); *G05D 1/0088* (2013.01); *G06Q 20/10* (2013.01); *B60W 2040/0809* (2013.01); *B60W 2050/007* (2013.01); *B60W 2540/18* (2013.01); *B60W 2556/00* (2020.02)

(58) Field of Classification Search
CPC ...... B60W 50/08; B60W 30/18; B60W 40/08; B60W 2556/00; B60W 2040/0809; B60W 2050/007; B60W 2540/18; G05D 1/0088; G06Q 20/10
See application file for complete search history.

(56) References Cited

U.S. PATENT DOCUMENTS

| 7,117,071 | B2 | 10/2006 | Aoki et al. |
| 7,730,984 | B2 | 6/2010 | Heap et al. |
| 8,585,540 | B2 | 11/2013 | Heap et al. |
| 8,812,203 | B2 | 8/2014 | Minamikawa et al. |

(Continued)

FOREIGN PATENT DOCUMENTS

CN    109131340 A  *  1/2019  .......... B60W 30/182

OTHER PUBLICATIONS

Hongtao Yu, Detection and Mitigation System for Unintended Acceleration: an Integrated Hybrid Data-Driven and Model-Based Approach. (Year: 2016).*

*Primary Examiner* — Elaine Gort
*Assistant Examiner* — Chanmin Park

(57) ABSTRACT

Vehicles, methods, and computer readable storage media are provided for implementing a hybrid control for an autonomous vehicle. The vehicle can be controlled by receiving a request from an individual for transportation in the vehicle. The vehicle can then navigate with an autonomous control component to the location of an individual to commence the transportation. Then the vehicle can detect, by one or more sensors, that the individual has entered the vehicle. Then, responsive to detecting that the individual has entered the vehicle, the vehicle can change from an autonomous control component to a hybrid control component wherein the hybrid component control comprises allowing the individual to control one or more vehicle control features that were under autonomous control in autonomous component control.

20 Claims, 12 Drawing Sheets

(56) References Cited

U.S. PATENT DOCUMENTS

| | | | |
|---|---|---|---|
| 9,381,916 B1* | 7/2016 | Zhu | G01S 17/931 |
| 9,821,800 B2 | 11/2017 | Yamakado et al. | |
| 11,130,494 B2* | 9/2021 | Ryne | B60W 10/18 |
| 2012/0055744 A1* | 3/2012 | Chen | B60T 8/267 |
| | | | 188/106 P |
| 2018/0224858 A1* | 8/2018 | Watanabe | G05D 1/0088 |
| 2018/0281848 A1* | 10/2018 | Zegelaar | B62D 6/003 |
| 2019/0080264 A1* | 3/2019 | Wasekura | G08G 1/202 |
| 2019/0086917 A1* | 3/2019 | Okimoto | B60W 50/08 |
| 2020/0023839 A1* | 1/2020 | Yan | B60W 40/09 |
| 2020/0260270 A1* | 8/2020 | Samuelsson | H04W 12/47 |
| 2020/0349833 A1* | 11/2020 | Lerner | G05D 1/0287 |
| 2020/0378778 A1* | 12/2020 | Glazberg | B60T 8/17 |
| 2021/0016830 A1* | 1/2021 | Riese | B62D 5/006 |
| 2021/0024097 A1* | 1/2021 | Jardine | B60W 60/0051 |

* cited by examiner

SYSTEMS AND METHODS FOR IMPLEMENTING A HYBRID CONTROL FOR AN AUTONOMOUS VEHICLE

FIELD

This disclosure relates to controlling a vehicle. More particularly, this disclosure relates to providing varying degrees of control for a vehicle.

BACKGROUND

Driving in general can be an entertaining and engaging activity, but that is overshadowed by the fact that driving is an extremely dangerous task that requires constant serious and sober attention. Autonomous vehicles do away with many risks associated with human error in driving, but also do away with the human engagement in driving. There continues to be a need for a hybrid vehicle that allows individuals to know the thrill of manual driving while protecting them autonomously from human error.

SUMMARY

The present disclosure includes methods for controlling a vehicle. In an exemplary embodiment, a method includes receiving, by the vehicle, a request for a transportation in the vehicle and then navigating the vehicle in an autonomous control component mode to the location of an individual to commence the transportation. The method includes detecting, by one or more sensors, that the individual has entered the vehicle and then responsive to detecting that the individual has entered the vehicle, changing the vehicle operation mode from an autonomous control component to a hybrid control component. The hybrid control component mode permits the individual to control one or more vehicle control features that were under autonomous control in autonomous control component. The method may further include changing the vehicle mode from an autonomous control component to a hybrid control component based on a determination that the individual has a valid license to drive the vehicle and payment received from the individual. The method may further include detecting by one or more sensors, that the individual has exited the vehicle and changing the vehicle operation mode from a hybrid control component to an autonomous control component. The method may further include acquiring data from one or more external sensors on the vehicle regarding one or more conditions outside the vehicle and determining a range of allowable actions for the vehicle based on the data from one or more external sensors. The one or more vehicle control features that are allowed under individual control in hybrid component control may be limited to the range of allowable actions. The range of allowable actions may further include a limit on at least one of, a rotation of a steering wheel, an acceleration of the vehicle, or a deceleration of the vehicle. The method may further include determining the range of allowable actions for the vehicle based on payment received from the individual. The method may further include providing instructions to the individual to stay within the range of allowable actions. The limit on the rotation of the autonomous vehicle's steering wheel may further include determining a proximity of the rotation of the autonomous vehicle's steering wheel to the limit of the range of allowable actions determined based on sensor data. In particular, the limit to range of allowable actions may include applying a resistance to the rotation of the autonomous vehicle's steering wheel based on the determined proximity. The method may further include applying a resistance to the rotation of the steering wheel if the proximity of the steering wheel is about 20 degrees from the rotation limit.

In an exemplary embodiment, a vehicle includes a computer configured to control substantially all features of the vehicle in an autonomous control component. A vehicle component is configured to receive a request by an individual and navigate to the location of the individual. The vehicle includes one or more sensors configured to detect that the individual has entered the vehicle and the computer is configured to change the operation mode from the autonomous control component to a hybrid control component once the individual has entered the vehicle. The hybrid control component of the vehicle is configured to allow the individual to control one or more vehicle control features that were under autonomous control in autonomous control component. The computer may be further configured to change operation mode from the autonomous control component to the hybrid control component responsive to at least one of: determining that the individual has a valid license to operate the vehicle, determining that the individual has paid the vehicle, determining that the individual audibly asked to have control of the vehicle, or individual activating an internal user control. The vehicle may further include one or more external sensors configured to determine a range of allowable actions for the vehicle where the hybrid control component limits vehicle controls to the range of allowable actions. The range of allowable actions of the vehicle may further include a limit on at least one of, a rotation of a steering wheel, an acceleration of the vehicle, or a deceleration of the vehicle. The hybrid control component may be configured to modify the range of allowable actions for the vehicle-based payment received from the individual. The hybrid control component may be configured to provide instructions to the individual to stay within the range of allowable actions. The vehicle computer may be configured to determine a proximity of the rotation of the autonomous vehicle's steering wheel to the limit of the range of allowable actions where the steering wheel is configured to apply a rotational force to the steering wheel that is based on the determined proximity.

Another general aspect is a computer readable storage medium in a vehicle having data stored therein representing software executable by a computer. The software in the computer includes instructions that, when executed, cause the vehicle to receive a request for transportation in the vehicle navigate in an autonomous control component to the location of an individual to commence the transportation, and detect by one or more sensors, that the individual has entered the vehicle. The vehicle changes from an autonomous control component to a hybrid control component in response to detecting that the individual has entered the vehicle where the hybrid component control comprises allowing the individual to control one or more vehicle control features that were under autonomous control in autonomous control component mode. The computer may further include acquiring data from one or more external sensors on the vehicle regarding one or more conditions outside the vehicle and determining a range of allowable actions for the vehicle based on the data from one or more external sensors where the one or more vehicle control features that are allowed under individual control while navigating with the hybrid control component are limited to the range of allowable actions. The range of allowable actions may further include a limit on at least one of, a rotation a steering wheel, an acceleration of the vehicle, or a deceleration of the vehicle. The limit on the rotation of the autonomous vehicle's steering wheel may further include determining a proximity of the rotation of the autonomous vehicle's steering wheel to the limit of the range of allowable actions where allowing the individual to control one or more vehicle control features further comprises applying a resistance to the rotation of the autonomous vehicle's steering wheel based on the determined proximity.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the present disclosure are utilized, and the accompanying drawings of which:

DETAILED DESCRIPTION

The disclosed subject matter describes an automated vehicle, such as, but not limited to, a taxi or ridesharing that may switch between manual and automated driving. The automated taxi may drive to an individual that requests it, whereby the automated taxi could switch to partial or full human control once the individual enters the vehicle. The automated vehicle could switch back to fully automated control after it drops off the individual. The automated taxi could be configured allow the individual to drive it within a limited set of parameters and revert to automated control if any parameters go beyond their allowable range, such as steering too sharply for the current speed. Thus, an individual driving the automated taxi can enjoy driving without worrying about its inherent dangers. The automated taxi may also pass regulations more easily than a fully automated vehicle because it can be configured to disable automatic control when there are individuals inside. The present disclosure is not limited to use by a single individual. Some embodiments may include, but are not limited to, multiple passengers or allowing multiple passengers to share control of the vehicle.

Figure 1A:
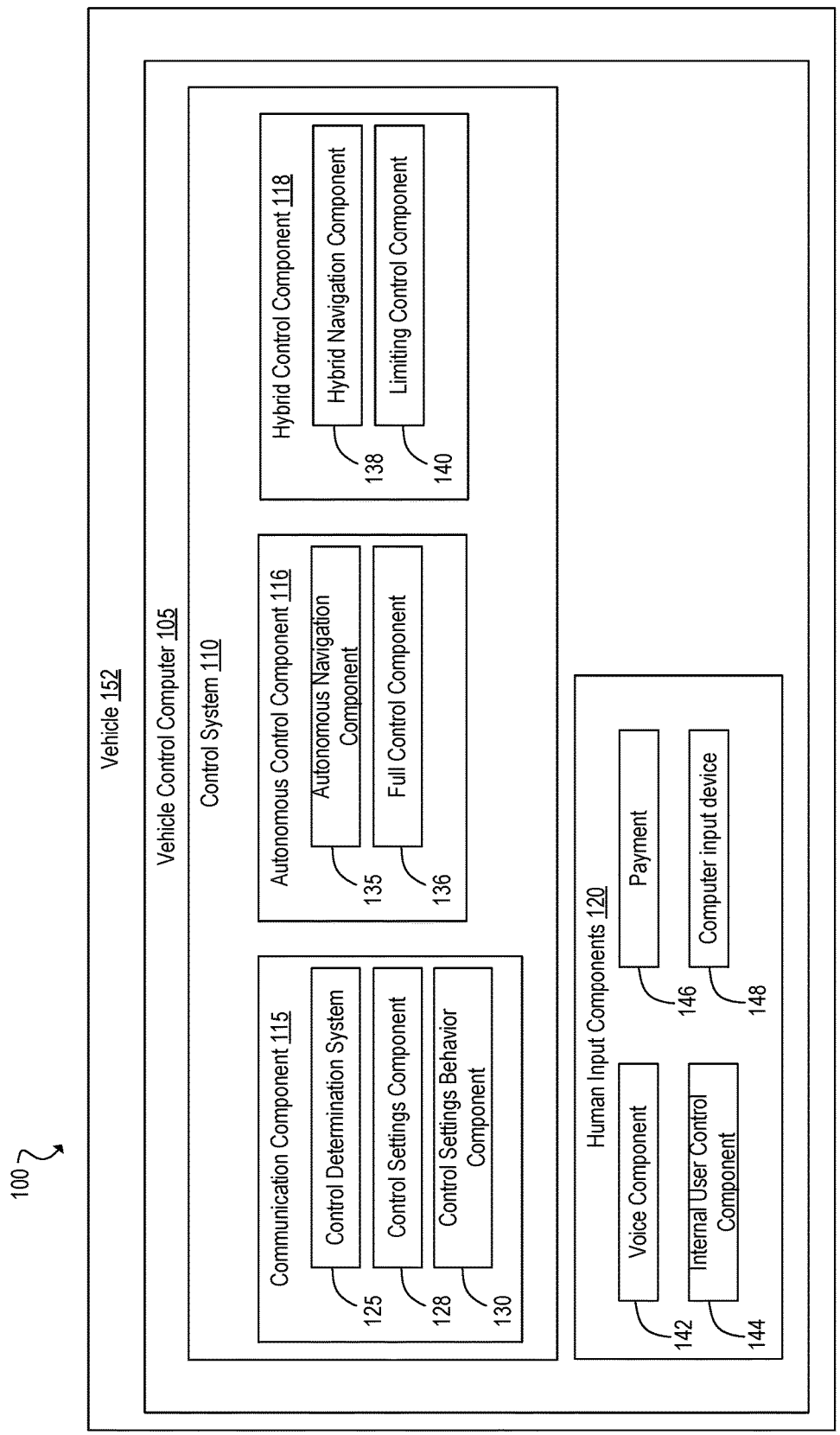
FIG. 1A is a schematic illustrating the components that may be used to implement various features of embodiments described in the present disclosure.

Referring to FIG. 1A, FIG. 1A is a schematic of a hybrid autonomous driving system 100 is provided showing the components that may be used to implement various embodiments in the present disclosure. The vehicle control computer 105 can control various operations of a vehicle 152 and includes a control system 110, and human input components 120. The vehicle control computer 105 can execute instructions directing the vehicle 152 to drive autonomously, allow full human control, or allow limited human control of the vehicle 152. The vehicle control computer 105 can continuously adjust the amount of control an individual has over the vehicle 152 based on data collected by external sensors 154 and internal sensors 156 (see FIG. 1B).

The vehicle control computer 105 may be any computer capable of receiving data from the vehicle 152 and sending instructions to the vehicle 152. The instructions sent by the vehicle control computer 105, when executed, can drive the vehicle 152 or limit manual control of the vehicle 152. The vehicle control computer 105 may be a single computer system, may be co-located, or located on a cloud-based computer system. The vehicle control computer 105 may be placed within a vehicle 152 or may be in a separate location from the vehicle 152. In some embodiments, It is possible for more than one vehicle 152 to share a vehicle control computer 105. The vehicle control computer 105 can include, but is not limited to, a control system 110 and human input components 120.

The control system 110 operates automated and hybrid navigation in the vehicle 152. The control system 110 may also allow full or limited human navigation by a driver in the vehicle 152. The control system 110 includes, but is not limited to, a communication component 115, an autonomous control component 116 that operates the vehicle 152 without human control, and a hybrid control component 118 that allows limited or full human control of the vehicle 152.

The communication component 115 directs one of either the autonomous control component 116 or the hybrid control component 118 to operate the vehicle 152 based on data that the communication component 115 receives. Such data may come from internal or external sources. Data from internal and external sources may be used to detect environment, driving conditions, the performance of vehicle 152, passenger information and various objects including potential pedestrians, traffic lights, road signs, oncoming vehicles, and preceding vehicles. Moreover, the data may be obtained prior to navigation, during navigation or both. As such, the communication component 115 receives data from other components of the vehicle 152 including external sensors 154, internal sensors 156, and human input components 120 (see FIG. 1B).

The communication component 115 includes a control determination system 125, a control settings component 128, and a control settings behavior component 130. The control determination system 125 continuously determines one of either the autonomous control component 116 or the hybrid control component 118 to operate the vehicle by comparing the data from other components of the vehicle 152 to variables set by the control settings component 128. The control settings component 128 contains types of changeable variables that are interpreted by the control determination system 125. For instance, in the exemplary embodiments, a fee variable is set in the control settings component 128. The control determination system 125 directs the autonomous control component 116 to operate the vehicle 152 until the fee is paid. Upon receipt of such payment the control determination system 125 directs the hybrid control component 118 to operate the vehicle 152. In the exemplary embodiments, a variable in the control settings component 128 may also be set to limit the speed of the vehicle 152 if a minimum available fees or credit is not received by the control determination system 125. Also, in the exemplary embodiments, a minimum allowable distance or time variable that the vehicle 152 may drive may be set. Further, in the exemplary embodiments, the control determination system 125 may disable human control if an individual attempting to drive the vehicle 152 does not present a license to drive or if the system is unable to verify a valid driver's license for the individual.

The control settings behavior component 130 can make adjustments to the control settings variables 202 based on how the vehicle 152 is driven under human control. The control settings behavior component 130 continuously adjusts the control settings component 128 based on its use. In an exemplary embodiment, the control settings component 128 may have individual variable values for each individual driver. The individual variable values of the control settings component 128 are stored and may be loaded when an individual is identified. The control settings behavior component 130 then adjusts the variables for the identified individual. The variables in the control settings component 128 may also be adjusted by internal user control component 144.

The autonomous control component 116 is configured to send instructions, that when executed, operate the vehicle 152 without human control. The autonomous control component 116 includes an autonomous navigation component 135 and a full control component 136. The autonomous navigation component 135 processes data from various sources including the external sensors 154 and internal sensors 156 (see FIG. 1B) to determine available routes to the vehicle. 152. The autonomous navigation component 135 interprets data from external sensors 154 to determine location, observe road conditions, find obstacles, read signage, determine relative positioning to other vehicles or moving objects, and interpret any other relevant events occurring external to the vehicle. The autonomous navigation component 135 can also interpret data from operation sensors 180 (see FIG. 1B) to determine the road conditions, mechanical and electrical conditional of the vehicle's 152. The autonomous navigation component 135 then may use this interpretation to determine a best course of action for the vehicle 152 to take. Once a best course of action is selected, the full control component 136 determines the instructions that will execute the best course of action and sends those instructions to the driving controls 158 (see FIG. 1B) that, when executed, operate the vehicle 152.

The hybrid control component 118 allows full or limited human control of the vehicle 152. The hybrid control component 118 includes a hybrid navigation component 138 and a limiting control component 140. Like the autonomous navigation component 135, the hybrid navigation component 138 processes data from the external sensors 154 and internal sensors 156 to determine where the available routes and paths for the vehicle 152. Specifically, here, the hybrid navigation component 138 determines a range of allowable actions the vehicle 152 can take based on the available routes and paths for the vehicle 152. This range of allowable actions are conditional limits that are activated when conditions are met. The range of allowable actions can include, but are not limited to, a limit on the allowable maximum/minimum speed range, a limit on the allowable number of times the vehicle swerves or crosses into an adjacent lane, a limit on the number of times the vehicle accelerates or decelerates above/below a certain rate or other qualitative measures. Once a range of allowable actions is determined, the limiting control component 140 determines instructions that will limit the vehicle 152 to the allowable range of actions. In an exemplary embodiment, the limiting control component 140 sends instructions to the driving controls 158 to allow human driver to maintain control of the vehicle 152 if the driver does not exceed the range of allowable actions. However, the system takes control of the vehicle 152 away from the human driver if the driver attempts to exceed the range of allowable actions.

The communication component 115 for the vehicle control computer 105 can receive data from external sensors 154, internal sensors 156, human input components 120, driving controls 158 and any other data that can be received by the vehicle control computer 105. The communication component 115 is also able to send data to other components of the vehicle 152.

The vehicle control computer 105 also comprises human input components 120. The components may be used to obtain and transmit data to other components or the vehicle control computer 105. The human input components 120 provide a direct interface between the control system 110 and human passengers in the vehicle 152. Components and settings in the control system 110 may be manipulated through the human input components 120. Moreover, data from the human input components 120 may be transmitted while the vehicle is operating in autonomous control mode or hybrid control mode. As described further below, the human input components includes, but is not limited to, a voice component 142, an internal user control component 144, a payment 146 and a computer input device 148. In some embodiments, payment 146 may be a payment component.

Human input components 120 can send instructions to the control determination system 125, that instructs the vehicle control computer 105 to switch control components. The control determination system 125 may be further instructed to modify the level of hybrid control component control by the human input components 120.

The voice component 142 input receives voice sounds from the microphone 176 (see FIG. 1B) and interprets the sounds into executable instructions. An example of a voice component 142 input executable instruction could be an individual saying "manual component control," which initiates an instruction to the control determination system 125 to switch control of the vehicle 152 from the autonomous control component 116 to the hybrid control component 118.

The internal user control component 144 are activatable input controls in the vehicle 152 that send signals to the control determination system 125. In an exemplary embodiment, internal user control component 144 are buttons in the vehicle 152 internal console, that when pressed, send instructions to the control determination system 125 to change control components or modify the currently running control components. Also, in an exemplary embodiment, the internal user control component 144 comprise steering wheel, gas pedal, and other physical controls, that when engaged, send an instruction to the control determination system 125 to switch the control component from autonomous control component 116 to hybrid control component 118. In an exemplary embodiment, an adjustable dial sends instructions to the control determination system 125 to modify the hybrid control component 118 to allow the vehicle 152 to be driven closer to other vehicles.

The payment 146 input device handles financial transactions and sends a signal instructing the control determination system 125 that an amount of payment has been made. In an exemplary embodiment for instance, the payment 146 input device may be a credit card slot. As yet another example, the payment 146 input device is a tray with a camera that can process images of currency in the tray to determine the amount of currency. Of course, the input device may be a scanner that is able to communicate with the individual's mobile device (e.g. phone) to initiate payment using various apps that are linked to the individual's financial institution.

The computer input device 148 can be any computing device with a processor, memory, storage, and a means of transmitting a signal to the control determination system 125. In an exemplary embodiment, the computer input device 148 is a mobile phone that transmits instructions to the control determination system 125 through a cellular connection. For instance, certain inputs may be received from the individual's mobile phone or tablet. Accordingly, the individual may request manual mode, autonomous mode, make payments, confirm driver's license, confirm identity or perform other input using a mobile device. The computer input device 148 may also be computer server. Moreover, the computer input device 148 may be a computer in the vehicle 152 with a display in the vehicle 152 console.

Figure 1B:
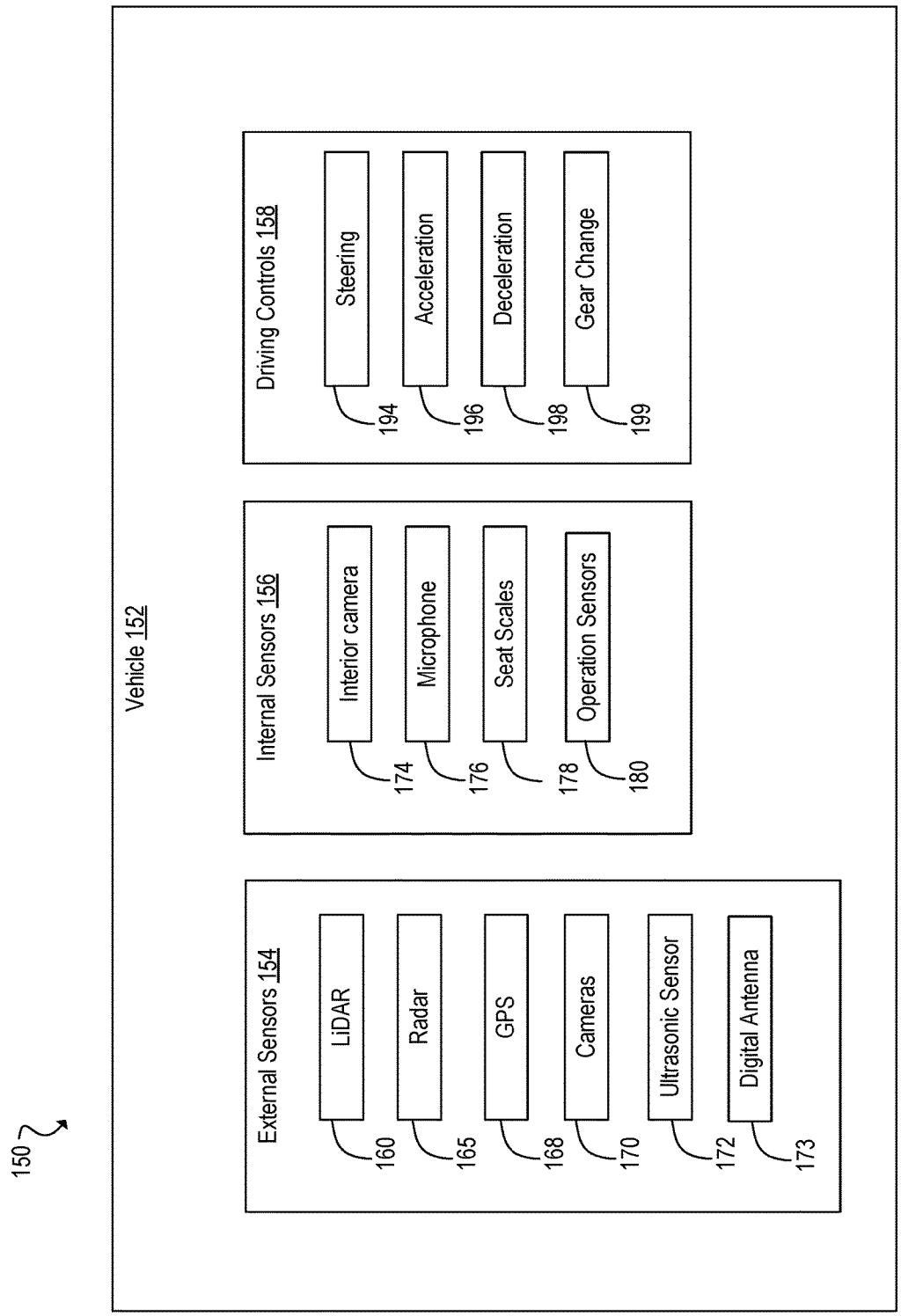
FIG. 1B is a schematic illustrating the components of a vehicle that may be used to implement various features of embodiment described in the present disclosure.

Referring to FIG. 1B, FIG. 1B is a schematic diagram 150 of various components in a vehicle 152, which may be used to implement the present disclosure. The vehicle 152 may be any form of transportation designed to transport one or more human passengers. A transportation, in the present disclosure, is the carrying of one or more human passengers. The transportation may comprise carrying the one or more human passengers from one location to another location. The transportation may also include carrying one or more human passengers in a loop and ending up in the same location. Possible examples of the vehicle 152 may be, but are not limited to, cars, trucks, buses, motorcycles, scooters, hoverboards, and trains.

Various components shown in the vehicle 152 include external sensors 154, internal sensors 156 and driving controls 158. The external sensors 154 collect data from the environment outside the vehicle 152. In the exemplary embodiments, external sensors 154 include, but are not limited to, LiDAR 160, radar 165, GPS 168 cameras 170, ultrasonic (proximity) sensors 172 and digital antennas 173. Data collected from external sensors 154 can be interpreted by the autonomous navigation component 135 or hybrid navigation component 138 to determine where the vehicle 152 should be allowed to drive.

The LiDAR 160 sensor on the vehicle 152 comprises an emitter capable of emitting pulses of light and a receiver capable of receiving the pulses of light. In an exemplary embodiment, the LiDAR emits light in the infrared range. The LiDAR measures distances to objects by emitting a pulse of light and measuring the time that it takes to reflect back to receiver. The LiDAR 160 can rapidly scan the environment outside the vehicle to generate 3d map of the vehicle's 152 surroundings.

The radar 165 sensor, like the LiDAR 160, comprises an emitter and receiver. The radar 165 sensor emitter is capable of emitting longer wavelengths of light than LiDAR that are typically in the radio wave spectrum. In an exemplary embodiment, the radar 165 sensor emits a pulse of light at 3 mm wavelength. The longer wavelength light from radar 165 will go through some objects that LiDAR 160 pulse would reflect.

The vehicle global positioning system ("GPS") 168 receives a satellite signal from GPS satellites and can interpret the satellite signal to determine the position of the vehicle 152. The GPS 168 continually updates the vehicle 152 position and sends that position to the autonomous navigation component 135.

Vehicle cameras 170 can capture image data and send the image data to the autonomous navigation component 135 to be processed. The navigation module can process the image data of objects and other environmental features around the vehicle 152. In an exemplary embodiment, images from vehicle cameras 170 are used to identify and read street signs. In an exemplary embodiment, images from vehicle cameras 170 are used to identify lane markings and crosswalks.

Data from ultrasonic sensors 172 may also be used to identify environment outside the vehicle 152. Ultrasonic sensors 172 detect objects by emitting sound pulses and measuring the time to receive those pulses. Ultrasonic sensors 172 can often detect very close objects more reliably than LiDAR 160, radar 165 or camera(s) 170.

Digital antennas 173 collect data from cell towers, wireless routers, and Bluetooth devices. Outside computer systems may transmit data about the outside environment. Such data may be collected by digital antennas 173. In an exemplary embodiment, a digital antenna 173 collects data transmitted from a cell tower about road conditions.

Internal sensors 156 in the vehicle 152 can inform the vehicle control computer 105 of the condition of the vehicle 152 and the condition of any individuals inside the vehicle 152. Internal sensors 156 may include, but is not limited to, interior cameras 174, microphones 176, seat scales 178, and operation sensors 180. The interior camera 174 may be one or more cameras capable of capturing image data from the interior of the vehicle 152. In an exemplary embodiment, the control system 110 processes image data from the interior camera 174 to determine the number of individuals in the vehicle 152 and where the individuals are sitting. In an exemplary embodiment, image data from the interior camera 174 is used to verify that the individual has a valid license to drive the vehicle 152. Also, in an exemplary embodiment, image data from the interior camera 174 is used to ascertain the mental and physical condition of the driver. In an example of this embodiment, control of the vehicle may to switched to the autonomous control component if the driver appears to be asleep. In another example, the interior camera 174 is configured to capture infrared image data that shows the heat emitted from objects inside the vehicle. Infrared image data may be used to distinguish inanimate objects from human beings. In other embodiments, the interior camera 174 may be coupled to a facial recognition system that is capable to recognizing the individual.

The microphone 176 in the vehicle records sounds from inside the vehicle. In an exemplary embodiment, the individual may adjust variables in the control settings component 128 by speaking into the microphone 176. The interior camera 174 may be used in combination with the microphone 176 to verify the identity of the individual speaking. In an exemplary embodiment, the facial recognition is used on an interior camera 174 image to identify the individual that is speaking into the microphone 176. The microphone 176 may also be used to determine if the driving system of the vehicle 152 is making noises that indicate poor working condition.

The seat scales 178, like the interior camera 174, may be used to determine the number of individuals that are inside the vehicle 152 and where they are sitting. Data from seat scales 178 may also be used to determine if an individual is light enough to require a child protective seat. The interior camera 174 may be used in combination with the seat scales 178 to distinguish between a light child and an inanimate object such as a package. In an exemplary embodiment, an infrared image from the interior camera 174 is used to verify that there is an individual child in a seat where the seat scale 178 registers a weight.

Operation sensors 180 in the vehicle 152 collect data from vehicle operations such as engine performance, fluid levels, tire pressure, and fuel/battery level. Data from the operation sensors 180 may be used to determine if the vehicle 152 will be allowed to take certain actions such as embarking on a long-distance drive.

The driving controls 158 include steering 194, acceleration 196, deceleration 198 and gear change 199. The driving controls 158 can be automated under the autonomous control component 116, operated in a limited control by the hybrid control component 118, or operated in full control under the hybrid control component 118. The steering 194 driving control changes the direction of the vehicle 152 and can be operated through a steering wheel, handlebars, joystick, shifting weight, or any other method of steering a vehicle. In an exemplary embodiment, the steering 196 control is manipulated by a steering actuator under control of the autonomous control component 116. When under limited control by the hybrid control component 118, the steering actuator prevents the steering wheel from turning beyond a limited range (e.g., limiting turn radius of the vehicle). In an exemplary embodiment, a resistance is applied by the actuator if the steering 194 control is turned within 20 degrees of a rotation limit. Other degree limits may be set as a condition to apply a resistance to the steering 194 control such as 30 degrees and 10 degrees.

The acceleration 196 driving control is a control that increases the velocity of the vehicle 152. The acceleration 196 can be operated through a pedal, lever, throttle, handle, or any other method of operating the acceleration controls of a vehicle. In an exemplary embodiment, the autonomous control component 116 controls the acceleration 196 of the vehicle 152 by sending instructions to an electronic throttle control. The hybrid control component 118 may limit the acceleration 196 by only allowing the electronic throttle control to be operated manually until a maximum speed is reached.

The deceleration 198 driving control is a control that decreases the velocity of the vehicle 152. The deceleration 198 can be operated through a pedal, level, handle, or any other method of operating the declaration controls of a vehicle. In an exemplary embodiment, the autonomous control component 116 controls the deceleration 198 by sending instructions to a brake by wire system. The hybrid control component 118 may limit the deceleration 198 by disabling manual control of the brake by wire system when a minimum velocity is reached.

The gear change 199 driving control changes the gear ratio of a vehicle 152 if the vehicle 152 has multiple gear ratios. The gear change 199 can be operated through a lever, paddle, button, or any other control that operates to change the gear ratio of a vehicle 152. In an exemplary embodiment, the autonomous control component 116 controls the gear change through a shift by wire system. The hybrid control component 118 may limit the gear change 199 driving control by making some gear ratios unavailable.

Figure 2A:
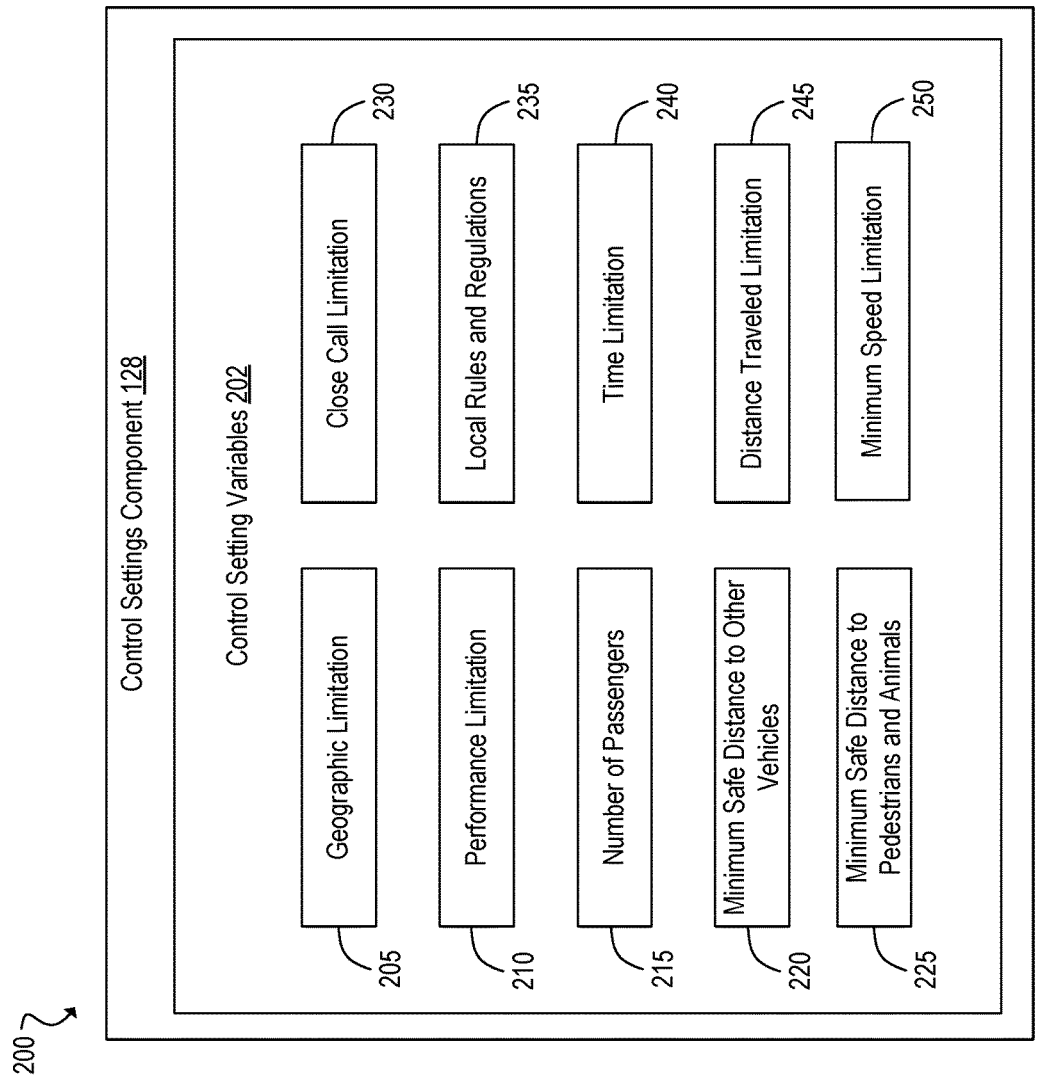
FIG. 2A is a schematic illustrating the control setting variables in accordance with a described implementation.

Referring to FIG. 2A, FIG. 2A is a schematic 200 illustrating the control setting variables 202 in accordance with a described implementation. The control setting variables 202 are condition variables that may be stored or set by the control settings component 128. The purpose of the control setting variables 202 is to limit control of the vehicle 152. When a condition for one of the control setting variables 202 is triggered, the hybrid control component 118 may limit control of the vehicle 152. Moreover, when a condition for one of the control setting variables 202 is triggered, the control determination system 125 may switch control of the vehicle to the autonomous control component 116. In an exemplary embodiment shown in the schematic 200 on FIG. 2A, control setting variables 202 include geographic limitations 205, performance limitations 210, number of passengers 215, minimum safe distance to other vehicles 220, close call limitations 225, minimum safe distance to pedestrians and animals 230, follow locals rules and regulations 235, time limitations 240, distance traveled limitations 245, and minimum speed limitations 250. The number of control settings variables 202 is not limited by the schematic 200 in FIG. 2A.

The geographic limitation 205 variable limits the vehicle to a geographic region. In an exemplary embodiment for instance, the geographic limitation 205 can set a distance radius limitation from an origin location. The origin may be the pickup location of the individual, a landmark, or a pre-chosen coordinate. The control determination system 125 GPS 168 continuously checks the position of the vehicle 152 and sends an instruction to switch the control of the vehicle 152 to the autonomous control component 116 if the GPS 168 shows that the vehicle 152 is more than the set distance from the origin location. Additionally, where the geographic limitation 205 is a set distance from an origin location, the hybrid control component 118 can limit driving controls 158 to controls that keep the vehicle 152 within the set distance from the origin. As yet another example, the geographic location may be limited to city, state or national borders. Of course, the boundaries may also be imposed based on other factors such as payment status.

The performance limitations variable 210 sets a limit on performance of the vehicle 152. In an exemplary embodiment, a performance limitation 210 is set such that it limits the maximum acceleration 196 of the vehicle 152. In this embodiment, the hybrid control component 118 does not allow the acceleration 196 driving control to be greater than a set amount. In another embodiment, the performance limitation 210 that set on the maximum acceleration 196 of the vehicle is disabled if a fee is paid by the driver of the vehicle 152. In another embodiment of the performance limitation 210, the steering 194 driving control 158 is limited to angles (e.g. turning radius) that steer the vehicle 152 within a set distance of a predetermined high-speed racing line on the road.

The number of passengers 215 variable limits control of the vehicle 152 based on the number of passengers entering or already in the vehicle 152. In an exemplary embodiment, the vehicle control mode switches from the autonomous control component 116 to the hybrid control component 118 if one or more passengers are in the vehicle 152. In an exemplary embodiment, the vehicle engine is shut off if too many individuals are in the vehicle 152.

The minimum safe distance to other vehicles 220 variable sets a minimum distance that the vehicle 152 may be to other vehicles while driving. In an exemplary embodiment, the hybrid control component 118 limits allowed actions of driving controls 158 to controls that do not take the vehicle 152 within the minimum safe distance of objects identified by the external sensors 154 such as other vehicles 220. Similarly, the minimum safe distance to pedestrians and animals 225 variable sets a minimum distance that the vehicle 152 may be to objects identified by the external sensors 154 as pedestrians or animals.

The close call limitation 230 variable limits the number of times that the vehicle 152 meets a condition before it switches to control by the autonomous control component 116. In an exemplary embodiment, the vehicle 152 switches to control by the autonomous control component if the minimum safe distance to other vehicles 220 condition is met more than a set number of times. Also, in an exemplary embodiment of the close call limitation 230, the vehicle 152 switches to control by the autonomous control component if the geographic limitation 205 condition is met for longer than a set period of time.

The local rules and regulations 235 variable limits the vehicle 152 to actions that are allowed by traffic rules. In an exemplary embodiment, the hybrid control component 118 will not allow the vehicle 152 to attempt to make a U-turn in an area where U-turns are against local rules or regulations. Also, in an exemplary embodiment, the hybrid control component 118 will not allow the vehicle 152 to run through a stop sign without coming to a full and complete stop. Also, in an exemplary embodiment, the hybrid control component 118 will not allow the vehicle to drive across a crosswalk while a pedestrian is walking in it.

The time limitation 240 variable limits the amount of time that the vehicle may be controlled by the hybrid control component 118. In an exemplary embodiment, the vehicle 152 switches from control by the hybrid control component 118 to control by the autonomous control component 116 after a set amount of time. In an exemplary embodiment, the hybrid control component 118 limits the driving controls 158 of the vehicle 152 to controls that take the vehicle 152 back to a destination after a set period of time.

The distance traveled limitation 245 variable limits the total distance that the vehicle may travel in a set period of time. In an exemplary embodiment, the vehicle 152 switches from control by the hybrid control component 118 to control by the autonomous control component 116 after the vehicle 152 travels a set distance. Also, in an exemplary embodiment, the vehicle distance traveled limitation is set to a higher limit if a fee is paid by an individual in the vehicle 152.

The minimum speed limitation 250 sets a minimum speed that the vehicle 152 may travel at. In an exemplary embodiment, the vehicle 152 switches control of the vehicle to the autonomous control component 116 if the vehicle 152 drops below a set speed. Also, in an exemplary embodiment, the vehicle 152 switches from control by the hybrid control component 118 to control by the autonomous control component 116 if the vehicle 152 drops below a set speed while it is traveling on a path that is designated to be driven at high speed.

Figure 2B:
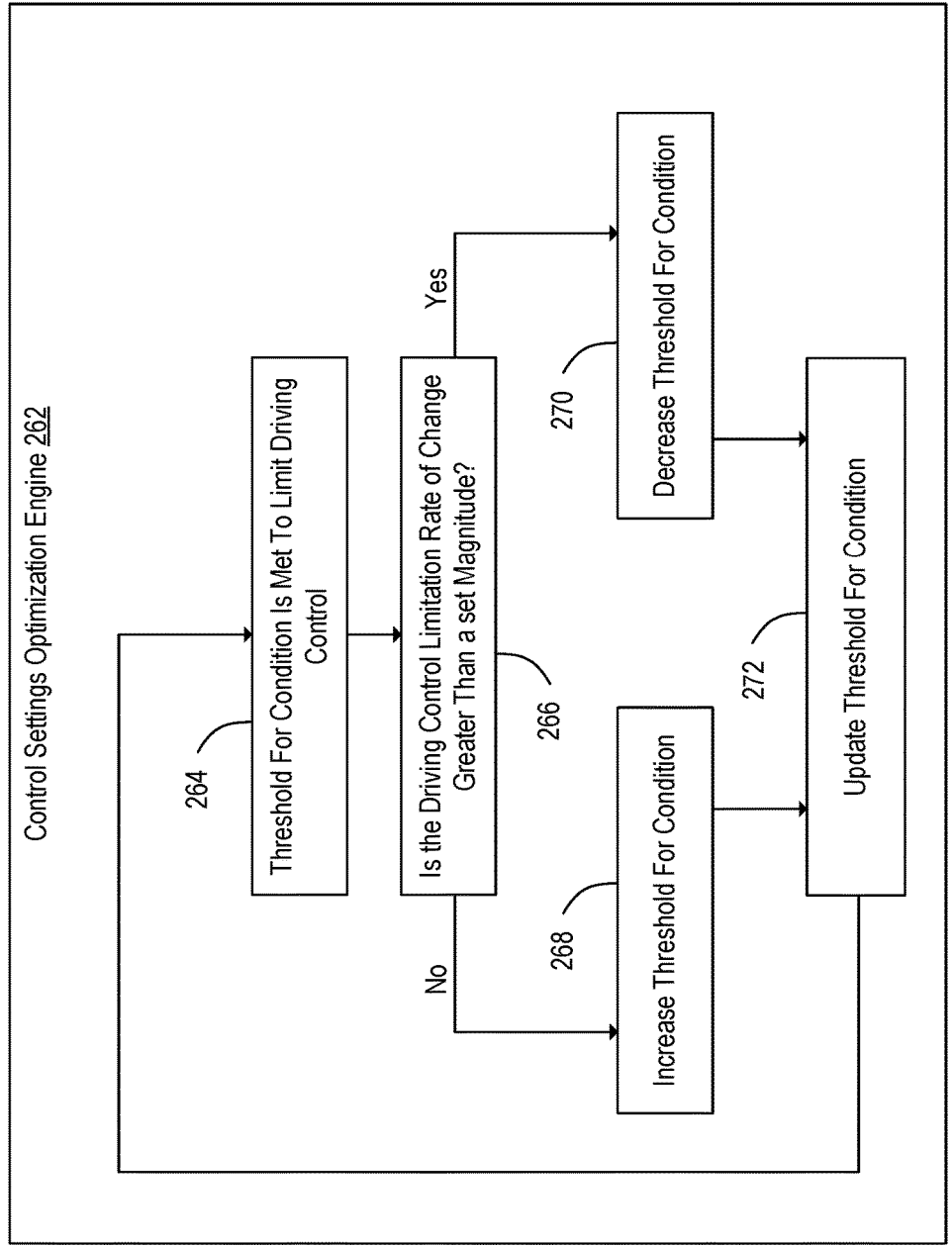
FIG. 2B is a flow diagram of a process for optimizing control setting variables.

Referring to FIG. 2B, FIG. 2B is a flow diagram 260 for optimizing the control settings variables 202. The control settings behavior component 130 continuously optimizes some control settings variables 202 to fit the driving characteristics of individual drivers. There are many ways to optimize variables to find the most effective value. One example of optimizing the control settings variables 202, shown in FIG. 2B, is to use a control settings optimization engine 262 to optimize the control setting variables 202 based on the magnitude of driving control 158 limitations.

Driving controls 158 may be limited while the vehicle 152 is being controlled by the hybrid navigation component 138. In an exemplary embodiment, the driving controls 158 are limited when the threshold of a control setting variable 202 is met. One example of a threshold of a control setting variable 202 being met is at step 264 when the vehicle 152 distance to another vehicle falls below the value of the minimum safe distances to other vehicles 220 variable.

At step 266, the vehicle control computer determines whether the rate of change to a driving control 158 limitation was greater than a set magnitude. A high rate of change to a driving control limitation would tend to result from the hybrid control component taking an emergency evasive action. The set magnitude can be any value that can be compared against the driving control 158 limitation. An example of a set magnitude is a steering 194 control limitation that results in a five-degree change per second in the vehicle's 152 steering wheel limitation.

At step 268, the threshold for the condition is increased if the driving control 158 limitation change is less than a set magnitude. An increased threshold means that the condition is more difficult to meet. In the case of the minimum safe distances to other vehicles 220 variable, an increased threshold decreases the minimum safe distance to other vehicles 220, making it more difficult to meet the condition.

At step 270, the threshold for the limitation is condition if the driving control 158 limitation change is more than a set magnitude. A decreased threshold means that the condition is easier to meet. In the case of the minimum safe distances to other vehicles 220 variable, a decreased threshold increases the minimum safe distance to other vehicles 220, making it easier to meet the condition.

At step 272, the threshold for the condition is updated in the control settings component 128. The control settings optimization engine 262 can now run with the updated condition. After many iterations of the control settings optimization engine 262, the control settings variables 202 may adjust to suit the driving style and behavior of individual drivers.

Figure 3:
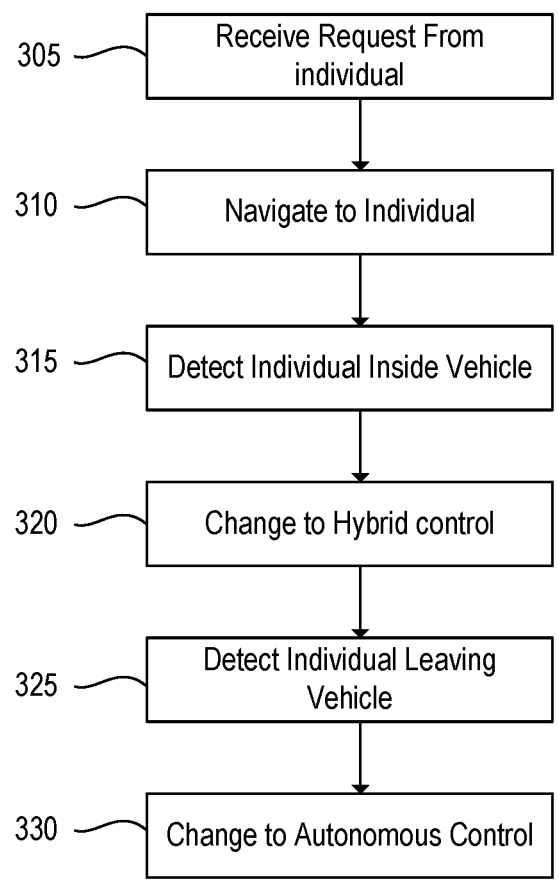
FIG. 3 is a flow diagram of a process for transporting an individual with the hybrid autonomous vehicle in accordance with a described implementation.

Referring to FIG. 3, FIG. 3 is a flow diagram 300 of a process for transporting an individual with a hybrid autonomous vehicle in accordance with a described implementation. At step 305, a vehicle 152 being controlled by the autonomous control component 116 receives a request from an individual. The request may be in any form. In an exemplary embodiment, the request is made by transmitting data over the interne. In particular the request may be made by transmitting data over a wide area network, local area network, or any other data transmission method.

At step 310, the vehicle 152 navigates to the individual while being controlled by the autonomous control component 116. In an exemplary embodiment, the autonomous control component 116 determines the best route to the individual and immediately drives to the individual. The vehicle 152 may be selected from a multitude of vehicles to navigate to the individual. The vehicle may have previously completed another task nearby or may be sent from a stored or parked location.

At step 315, the vehicle 152 detects the individual inside the vehicle 152. In particular, determining that the individual is in the car can include, specific confirmation from the individual (e.g. confirmation), various sensor data, or a combination thereof. In an exemplary embodiment, the vehicle detects the individual by interpreting data collected by internal sensors 156 in the vehicle 152. In an exemplary embodiment, the vehicle may detect the individual by receiving payment from the individual. In an exemplary embodiment the individual is detected by the individual's physical engagement of one or more driving controls 158.

At step 320, the control determination system 125 sends an instruction that, when executed, switches the control of the vehicle 152 from the autonomous control component 116 to the hybrid control component 118. In an exemplary embodiment, the control determination system 125 does not switch control of the vehicle 152 over to the hybrid control component 118 until a payment 146 is received from individual. Also, in an exemplary embodiment, the hybrid control component allows the vehicle 152 to be driven with reduced or no limitations. Also, in an exemplary embodiment, the hybrid control component 118 limits control of the vehicle 152 based on control setting variables 202.

At step 325, the vehicle 152 detects the individual leaving the vehicle 152. In an exemplary embodiment, the vehicle's 152 internal sensors 156 detect the individual leaving. Also, in an exemplary embodiment, an individual sends a signal to the vehicle 152 with the instruction that there are no individuals inside the vehicle 152. In another embodiment, the vehicle 152 assumes that the individual has left the vehicle 152 when there is no manipulation of the driving controls 158.

At step 330, the control determination system 125 sends an instruction that, when executed, switches the control of the vehicle 152, from the hybrid control component 118 to the autonomous control component 116. In an exemplary embodiment, the vehicle 152 remains stationary under autonomous control until it is requested by another individual. In an exemplary embodiment, the vehicle 152 drives under autonomous control while waiting for another request from an individual.

Figure 4:
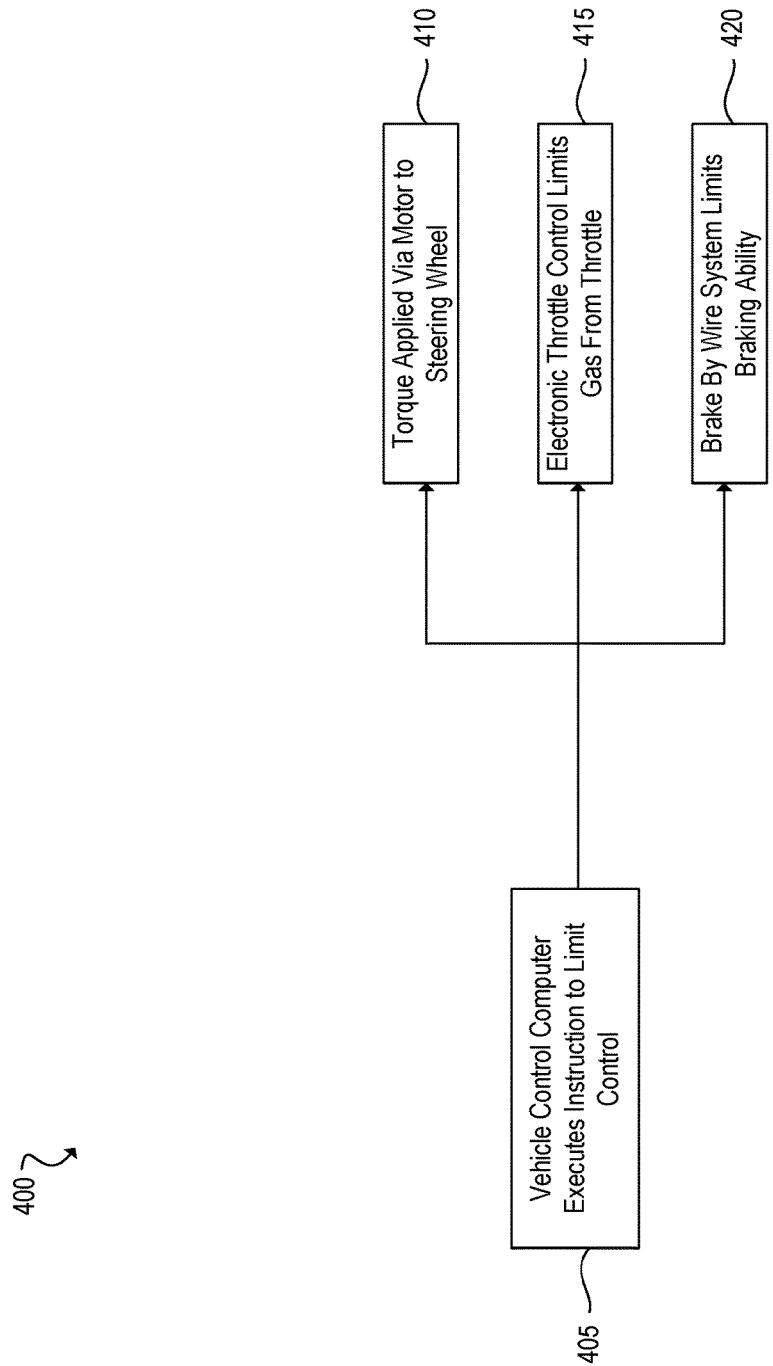
FIG. 4 is a flow diagram of a process for limiting the allowable actions of a vehicle's steering, throttle, and brakes.

Referring to FIG. 4, FIG. 4 is a flow diagram 400 of a process for limiting the allowable actions of a vehicle steering, throttle, and brakes. The hybrid control component 118 limits control of the vehicle 152 such that the vehicle 152 is only partially under an individual's control. The hybrid control component 118 determines a range of allowable actions for the vehicle 152 to take and sends instructions to limit the individual's driving controls 158 to the range of allowable actions. The driving controls 158 may be limited in many ways. In some embodiments, the driving controls 158 are limited by physically restricting movement of the driving control 158 devices. The driving controls 158 can also be limited electronically by restricting the signals sent by the driving controls 158 to signals that are in the range of allowable actions. The present disclosure contemplates limiting control of a vehicle 152 by essentially any physical or electronic means, which can be safely implemented in such vehicles.

At step 405 the vehicle control computer 105 executes an instruction to limit control of the vehicle 152. The vehicle control computer 105 may execute an instruction to limit one or more driving controls 158 at once. Here, the vehicle control computer executes an instruction to three driving controls 158 at once. Although not shown, many other types of driving controls relating to operation of the vehicle and access to features of the vehicle, may be limited. The hybrid control component 118 sets limited control based on the allowable actions that it determines from control settings variables 202 and environment outside seen by the external sensors 154. The control settings variables 202 may be set to prioritize any purpose. In an exemplary embodiment, the control settings variables are set to prioritize safety and limit the driving controls 158 based on safe driving guidelines. In an exemplary embodiment, the control settings variables 202 are set to prioritize recreation and limit the driving controls 158 based on a predetermined entertainment course, such as a ride. In another embodiment, the control settings variables 202 are set to prioritize training and limit driving controls based fulfilling predetermined goals or destinations.

At step 410, torque is applied via a motor to the steering wheel to limit control of the steering 194 control. In an exemplary embodiment, enough torque is applied to overpower any individual driver such that the steering 194 control is absolutely limited. In another embodiment, the torque is low enough that a driver can overpower it. In another embodiment, the torque force is increased as the steering 194 control is turned further outside the allowable range of control.

At step 415, the electronic throttle control limits gas from the throttle or in an electrical vehicle electricity (voltage or current) to the motor to limit the acceleration 196 control to an allowable range. In an exemplary embodiment, the amount of gas released by the electronic throttle control does not increase after the gas pedal is pressed past a set point. In one implementation of this embodiment, a light indicates to the driver that gas is being limited. In an exemplary embodiment, a minimum speed limitation limits the acceleration to a non-zero range. In this embodiment, gas is released by the electronic throttle control even if the gas pedal is not being pressed. The embodiments discussed herein are limited to gas powered engines. Other embodiments are envisioned for vehicles that are not gas powered. In an exemplary embodiment of an electric power vehicle, a signal is sent to adjust the rotation speed of the engine.

At step 420, a brake by wire system limits braking ability in the vehicle 152 to limit its deceleration 198 control. A brake by wire system is electronically controlled, thus the instruction to limit control at step 405 may be carried out irrespective of the individual driver engaging a brake physically. As with the limit on electronic throttle control of step 415, here too the braking ability of the vehicle 152 may be set to a non-zero range.

Figure 5:
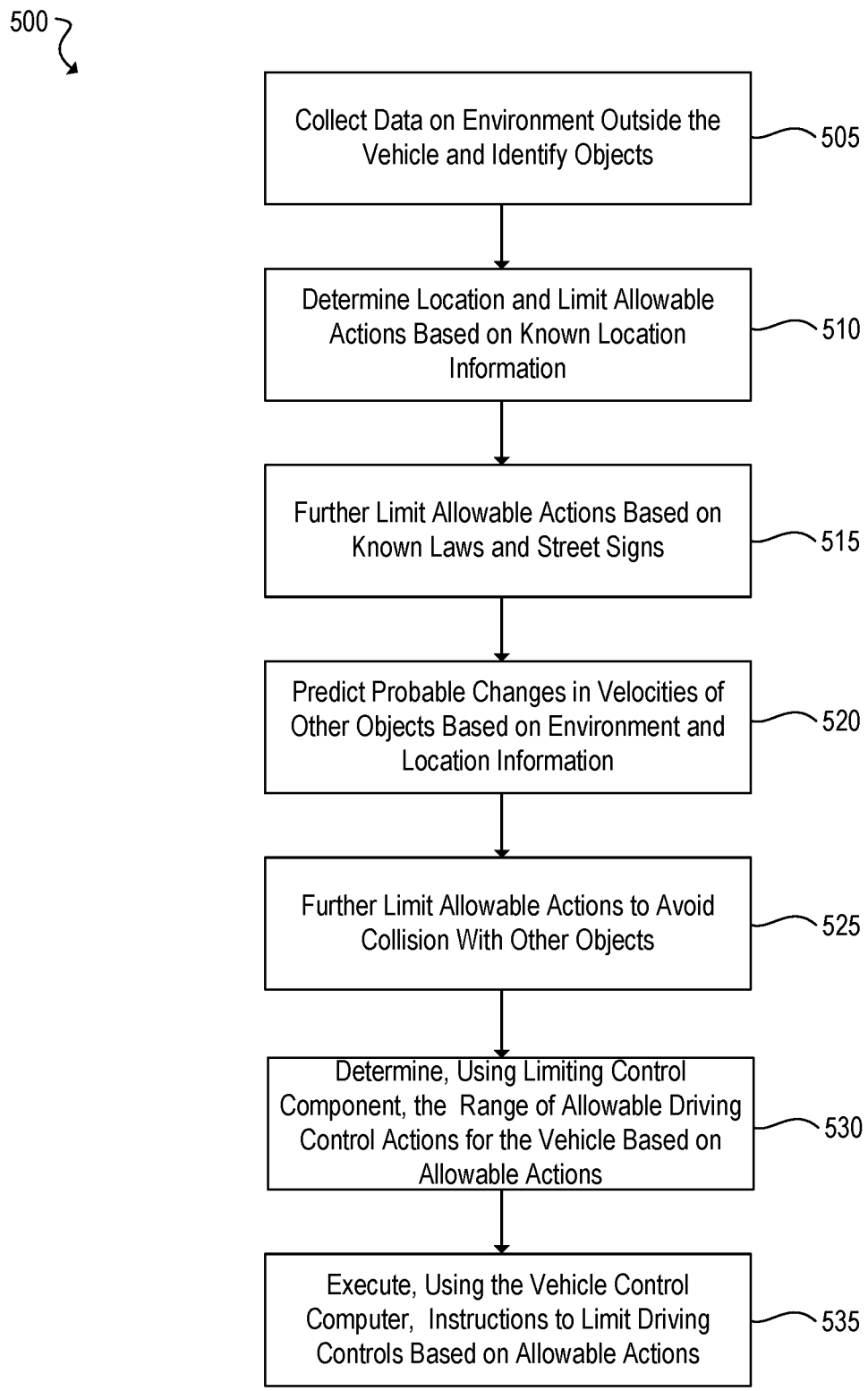
FIG. 5 is a flow diagram of a process for limiting the allowable actions of a human driver.

Referring to FIG. 5, FIG. 5 is a flow diagram 500 of a process for limiting the allowable actions of a human driver. The steps of limiting the allowable actions of an individual are performed if the vehicle 152 is under the control of the hybrid control component 118. The hybrid navigation component 138 determines the allowable actions of the vehicle 152 and the limiting control component 140 executes the limited control on the driving controls 158. The purpose of limiting control of the vehicle 152 is to give the driver freedom to drive the vehicle 152 manually until a condition is met, whereby, the freedom to drive the vehicle 152 manually is limited or taken away.

At step 505, data of the environment outside the vehicle 152 is collected by external sensors 154. Once environmental data is collected, the hybrid navigation component 138 identifies objects around the vehicle 152 such as other vehicles, pedestrians, animals, street signs, and street signals. There are many processes to identifying objects around a vehicle 152 using external sensors 152 and a person skilled in the art will understand how to implement this step. In an exemplary embodiment, objects outside the vehicle 152 are identified by their shape, as indicated by LiDAR 160, radar 165, and cameras 170. In an example of this embodiment, the vehicle 152 may use timed sequential pulses from the LiDAR 160 that reflect off the surface of one or more objects or road surfaces and captured by the LiDAR 160.

At step 510, the vehicle's 152 location is determined and known information about the location is used to limit the allowable actions of the vehicle 152. Data from the GPS 168 or camera 170 sensors may be used to identify the vehicle's 152 location. The known information about the location can include information about the location that is already stored on the vehicle or a readily accessible storage medium outside the vehicle. In one example, the data may source from the individual's mobile device. In an exemplary embodiment, a vehicle 152 position is identified by GPS 168 data. The position is then correlated to map data that is already stored in the vehicle computer storage. Map data may include information on roads, signs, and local laws. The hybrid navigation component 138, based on such information, can then limit the allowable actions to stay on the roads.

At step 515, the hybrid navigation component 138 further limits the allowable actions of the vehicle 152 to actions that comply with known laws and street signs. Street signs may be already known for a location or identified by external cameras 168. In one example, the ability to change lanes is limited in a location where changing lanes is against the law. Similarly, lowered speed limits in construction and school zones may be imposed as limits on allowable actions.

At step 520, the probable changes in velocities of other objects around the vehicle are predicted based on various data including the environment and location information. For example, other vehicles are predicted to modify their velocities in accordance with local laws and to stay on the road. Other vehicles are also predicted to modify their velocity to avoid objects in their paths, possibly causing more vehicles to modify their velocity. Similarly, pedestrians are predicted to cross the road at a known pedestrian crossing.

At step 525, after predicting the change in velocities of other objects, the hybrid navigation component 138 limits the allowable actions of the vehicle to avoid collision with other objects. In an exemplary embodiment, the ability to maneuver the vehicle 152 close to the predicted location of other objects is limited to a set distance to those other objects. In another embodiment, the ability for the vehicle 152 to stay stationary is limited in order to get the vehicle 152 out of the path of other approaching vehicles.

At step 530, the limiting control component 140 converts the allowable actions to a range of allowable driving control 158 actions. The allowable actions for the vehicle might comprise an area around the vehicle 152 The limiting control component 140 determines the range of driving controls 158 that would keep the vehicle 152 within the area around the vehicle. As such, the allowable actions are converted into driving controls 158 that the vehicle 152 is capable of performing.

At step 535, the vehicle control computer 105 executes instructions determined in step 530 to limit driving controls 158 based on the allowable driving control actions. In an exemplary embodiment, also shown in FIG. 4, the instructions to limit driving controls 158 are sent to limit steering 194, acceleration, 196, and deceleration. Here, the steering wheel is limited by applying torque via a motor 410, acceleration 196 is limited by electronic throttle control 415, and deceleration 198 is limited by a brake by wire system 420. In this embodiment a gas-powered automobile is envisioned as the vehicle. However, the present disclosure is not limited to vehicles 152 embodied as gas-powered automobiles. For example, another embodiment of the present disclosure may be implemented for a motorcycle, a bus, a truck, an SUV. Each of the above-mentioned vehicles may be powered electrically or using gasoline.

Figure 6:
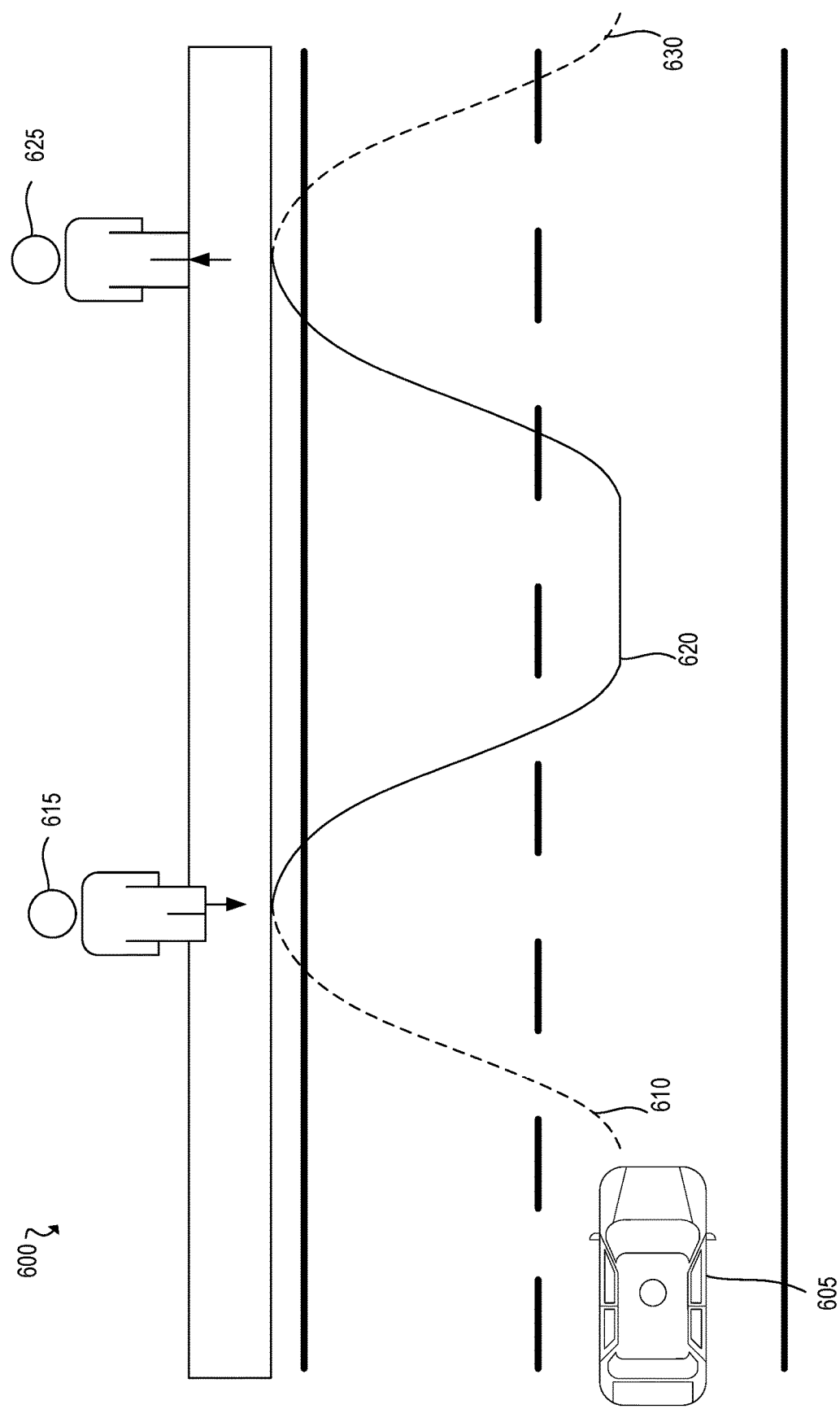
FIG. 6 illustrates an example of a hybrid control autonomous vehicle picking up a passenger and dropping off the passenger.

FIG. 6, a conceptual representation of a transportation of an in individual. an illustration of the process shown in FIG. 3. As shown, a vehicle capable of operating in hybrid and autonomous modes by picks up a passenger 615, drives under hybrid control 620, drops off the passenger 625, and drives again under autonomous control 630. This illustration 600 does not limit the possible embodiments of the present disclosure to automobiles 605 and may be applicable to various other forms of transportation. Moreover, the present disclosure contemplates various other scenarios involving multiple passengers, multiple stops, and multiple change in modes during a trip between a pick and destination locations.

As shown, the automobile 605 begins under the control of the autonomous control component 116. The automobile 605 receives a request from the individual 615 to be picked up. The automobile 605 then drives 610 autonomously to the individual 615 so that the individual can enter the vehicle 152. Once the automobile 605 detects that the individual 615 has entered the vehicle 605, the control determination system 125 switches control of the automobile 605 to the hybrid control component 118. At this point, automobile 605 may be under full human control or limited human control as it is driven 620 by the individual. Upon arriving at the destination, the individual exits the automobile at 625. Once the automobile detects that the individual is no longer inside, the control determination system 125 switches control of the automobile back to the autonomous control component 116. The automobile 605 may then drive autonomously away 630.

In exemplary embodiments, the automobile 605 is envisioned as a taxi service whereby an individual may pay for an automated taxi to pick up the individual. Payment may be received prior to, or at the time of pick up. The automated taxi could then switch to human control and the individual could drive themselves to the desired destination. Once the individual is dropped off, the automated taxi would drive away autonomously. The individual may pay an extra fee to unlock high-performance features of the automated taxi such as greater acceleration 196. In one example, the automobile is an entertaining ride that follows a preset course. After the individual is picked up by the automated automobile entertainment ride, the automobile entertainment ride switches from autonomous control to limited hybrid control, whereby the individual may control the automobile entertainment ride with the limitation that the automobile must be driven within the preset course. The individual may be picked up at a point on the preset course or taken to the preset course where the entertainment features are activated.

Figure 7:
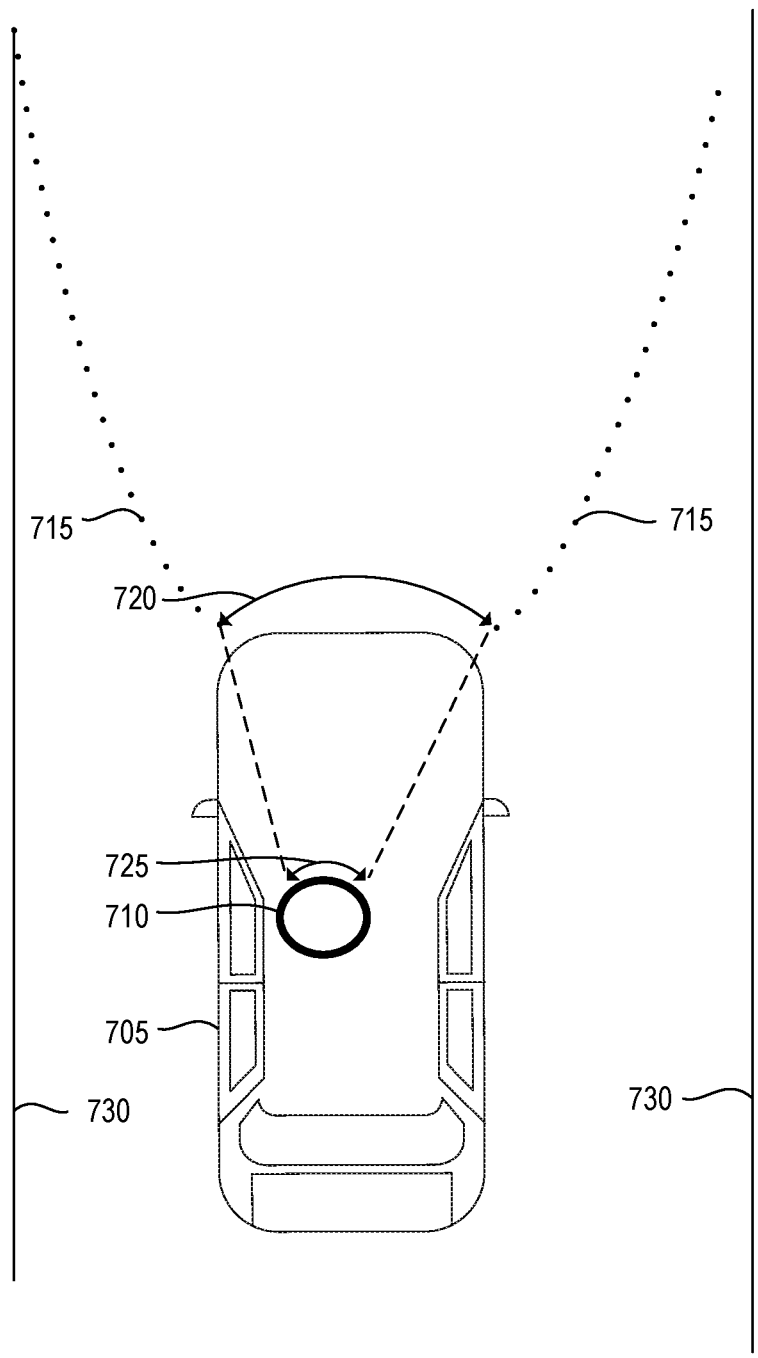
FIG. 7 illustrates an example of the limited control system that may be applied to a vehicle's steering.

Referring to FIG. 7, an illustration 700 is provided which conceptually represents the limited control system applied to automobile steering. Here, a simplified top view of the passenger compartments an automobile 705 is shown including the steering wheel 710. The allowable actions (e.g., steering direction and angle) for the automobile 705 is depicted as the area in front of the automobile 705 within the dotted lines 715.

In this example, allowable actions for the automobile 705 are determined by the hybrid navigation component 138. As explained previously, the hybrid navigation component 138 uses data from the external sensors to determine the allowable actions for the automobile. The allowable actions in the illustration 700 is depicted as an area around the automobile 705 within which the vehicle may be navigated. Specifically, here, the dotted lines 715 set the limits of direction of navigation, for various reasons such as, but not including, staying within the road boundaries 730. The area in between the road boundaries 730 delineates a drivable road such as street, highway, or dirt path. Accordingly, to stay within allowable driving limits 715, the individual may only rotate the steering wheel 710 within the allowed steering range 725.

The steering range 725 can be the range of directions that the forward moving automobile 705 may be steered in. Moreover, the steering range 725 can correspond to the steering driving control 194 that may be determined by the limiting control component. Accordingly, the limits to the steering range 725 may be tied to the allowable action driving area 715. In embodiments where the vehicle is steered by a means other than a steering wheel (e.g. joystick, bar, etc.) physical limitations means for such alternative steering may be placed to achieve the allowable driving area 715. The acceleration 196 and deceleration 198 driving controls 158 may also be determined by the limiting control component 140 from the allowable action driving area 715. Thus, direction, speed and breaking functions may be limited together.

In an exemplary embodiment, a sufficient amount of torque may be applied to the steering wheel 710, via a motor connected to said steering wheel 710, to limit manual steering to the steering range 725. For instance, manual steering 194 could be strictly limited to the steering range 725 and a torque applied via a motor to the steering wheel 710 could 710 prevent any steering beyond the steering range. The amount of torque applied may gradually increase as the steering wheel 710 rotation nears the limits of the steering range 725. Alternatively, the resistance may remain substantially constant until at or near the steering range 725 limit. In yet another example, manual steering 194 could be less strictly limited with a lower torque applied to the steering wheel 710 to limit the steering range but may be overpowered by the human driver.

Figure 8:
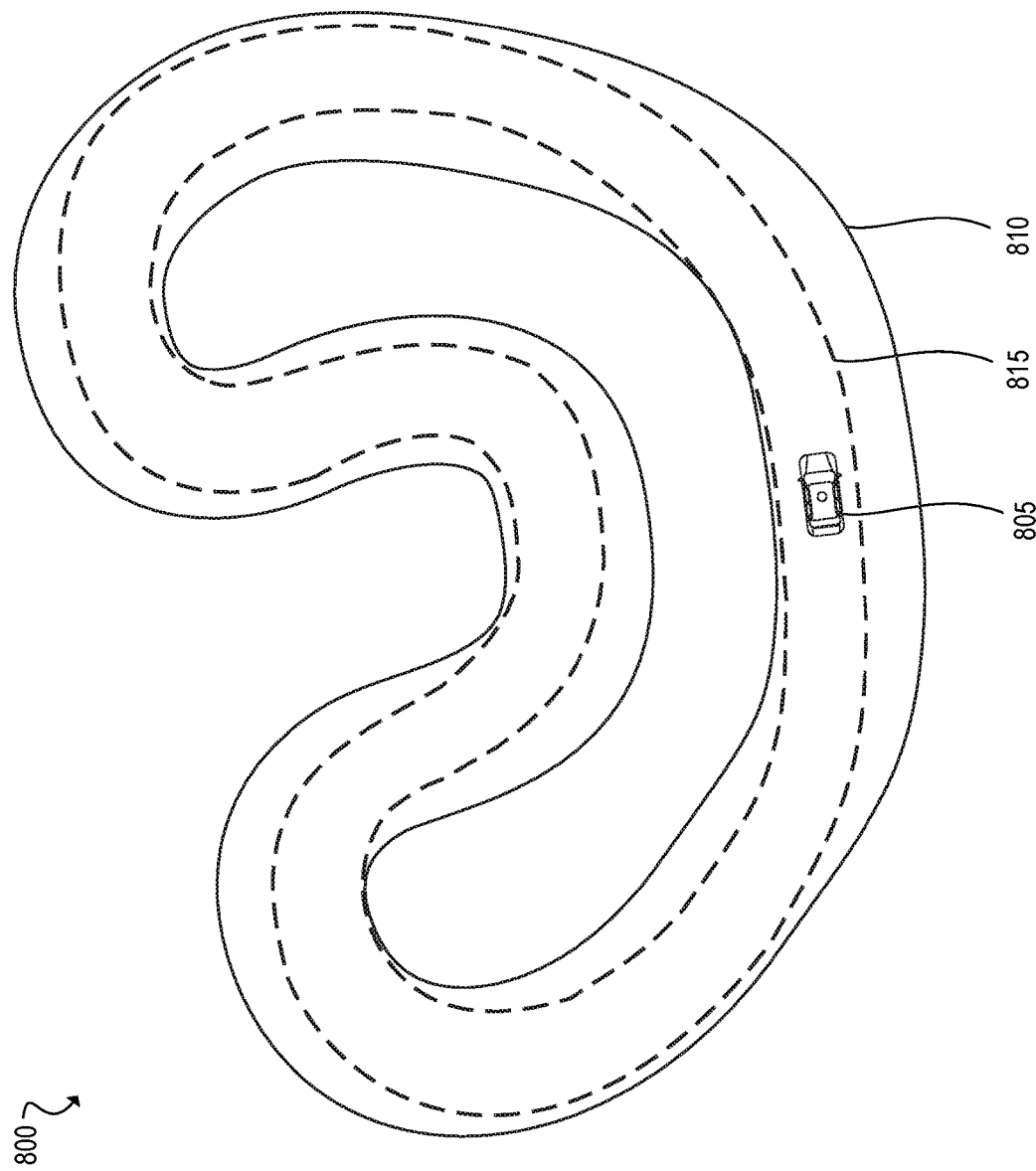
FIG. 8 illustrates an example of the limited control system applied to limit the path that an individual can drive a vehicle around a sample street.

FIG. 8, illustrates a vehicle's 805 path being limited around a road 810. Although the road 810 is shown as a closed path, this example may apply to other road configurations that may or may not be closed. Here, the control settings variables 202 can be configured to enhance the entertainment of driving the vehicle 805 by limiting the driving controls 158 to follow a high-speed path 815 around a road 810. The road 810 may be any path that the vehicle 805 can drive on. A non-limiting example is a racing track. This feature provided in this example may also be used for training purposes to provide an individual more experience and comfort operating at high speeds or navigating challenging terrain. Moreover, it may be used for sales or marketing endeavors whereby a potential customer is able to experience a range of vehicle capabilities in a safe environment. The road is preferably a private road or one where it is legally permitted to drive vehicles of the exemplary embodiments at the higher speeds.

The high-speed path 815 may be determined in real time by the hybrid navigation component 138 based on control setting variables 202 or preset directly in the control setting variables 202 by the vehicle or a human operator. In an exemplary embodiment where the high-speed path is preset, the geographic limitation 205 control setting variable may be preset to limit the vehicle 805 to follow a high-speed path 815 and a minimum speed limitation 250 is preset to speeds based on the location of the vehicle 805 on the high-speed path 815. Accordingly, the speed of the vehicle 805 is managed to navigate at high speeds on curvy paths safely.

Figure 9:
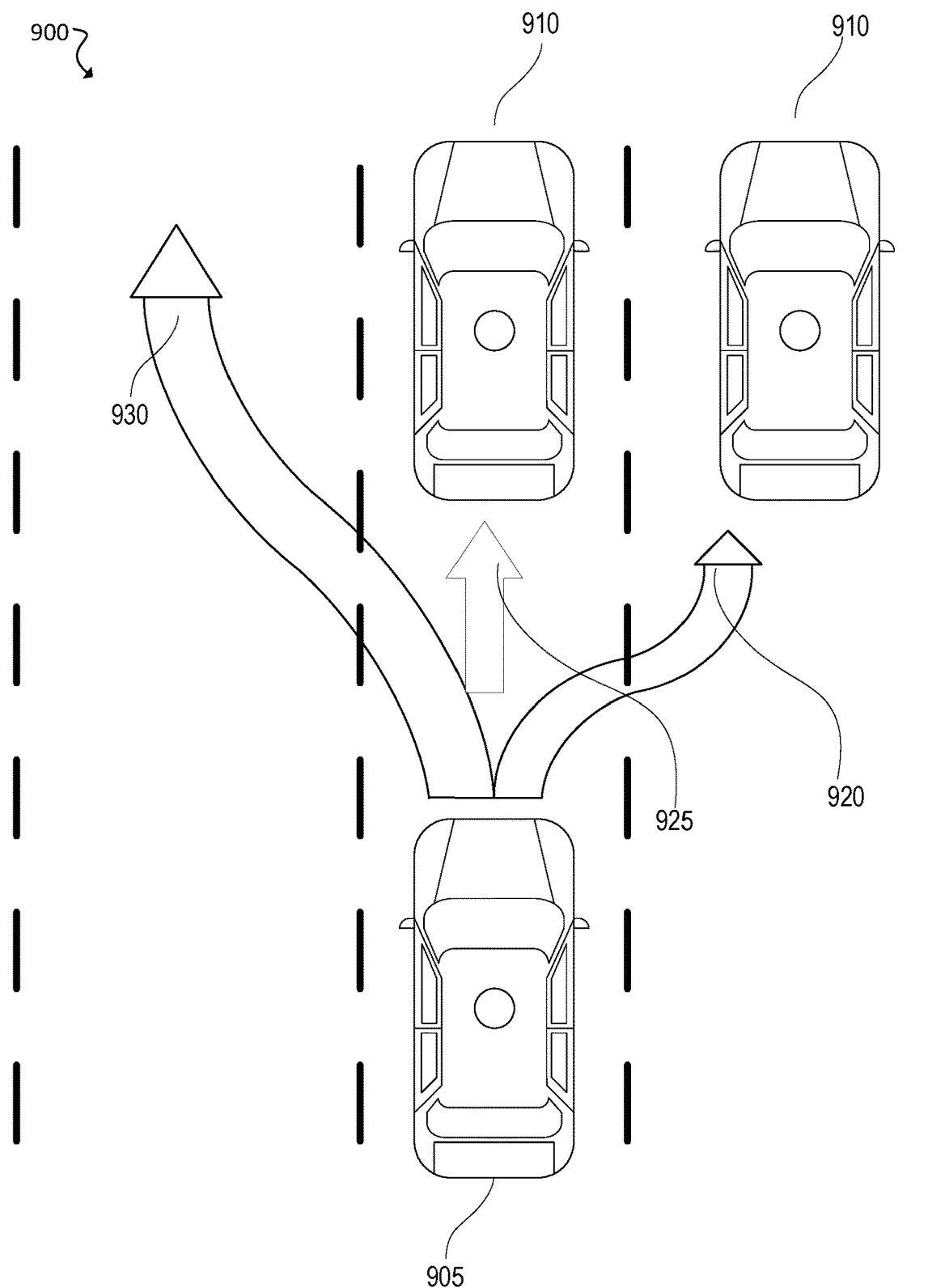
FIG. 9 illustrates an example of allowable actions of a vehicle on a road with other vehicles.

Referring to FIG. 9, FIG. 9 is an illustration is shown for the allowable actions of a vehicle 905 that may be moving on a road with other vehicles 910 that may be moving. To limit the vehicle 905 to a minimum distance from the other vehicles 910, the vehicle's 905 acceleration 196 may be limited if the driver attempts to steer right 920 or go straight 925. The vehicle's 905 acceleration 196 is not limited if the driver attempts to steer left 930 because the vehicle 905 remains a minimum distance from the other vehicles 910. Similarly, the vehicle's deceleration 198 may be limited if there is another vehicle close behind the vehicle 905.

The hybrid navigation component 138 can determine the allowable actions of the vehicle 905 based on environmental data collected by the external sensors 154. Other vehicles 910 on the road can be identified by data from LiDAR 160, radar 165, or cameras 168, a combination thereof, or another type of external sensor. In some instances, the vehicles may directly communicate their location to each other. Once other vehicles 910 are identified, the other vehicles' 910 velocities can be determined by their change in position over time. Of course, the system may also consider the hybrid navigation component 138, which can then limit the vehicle's 905 allowable actions to stay a minimum distance from the other vehicles.

Figure 10:
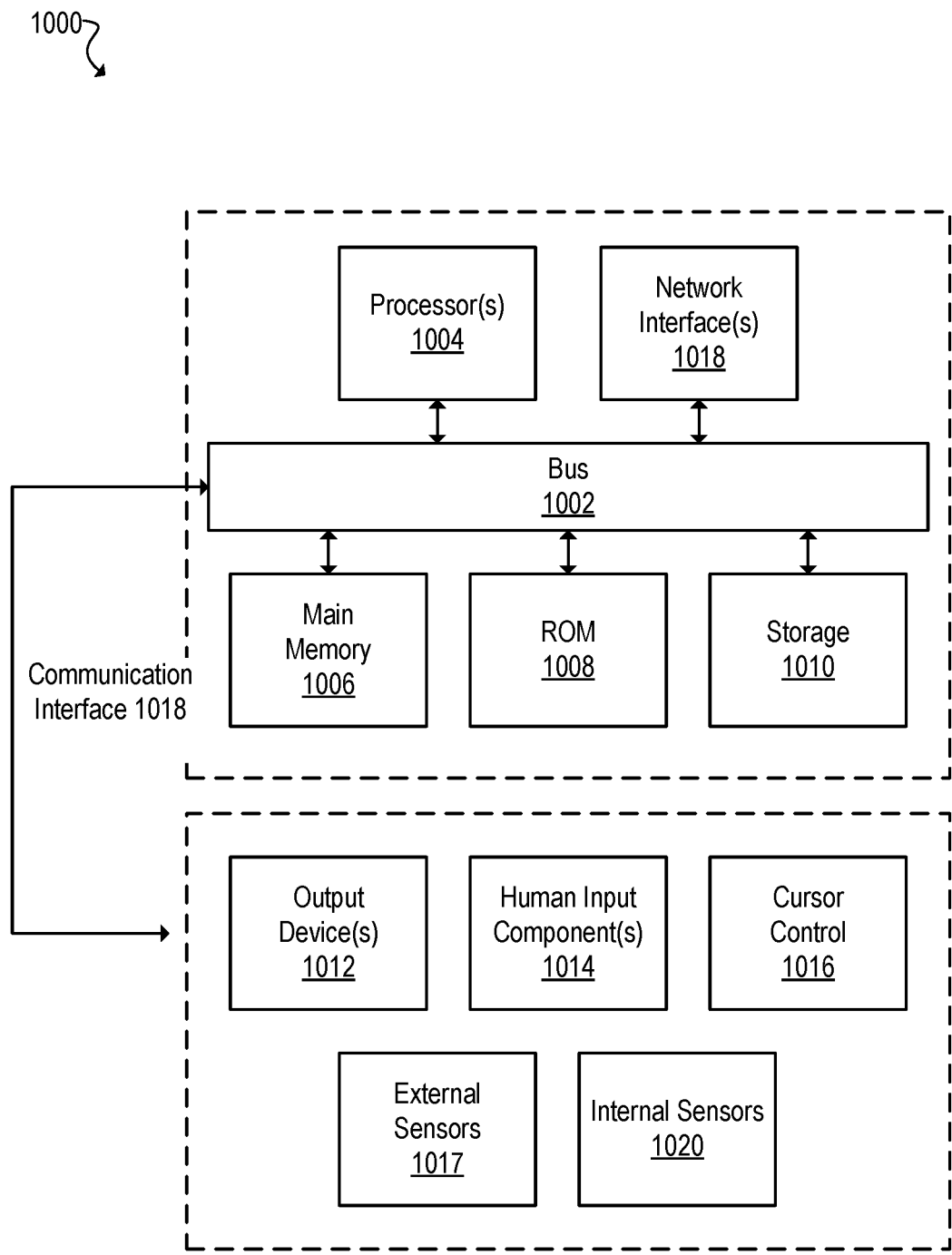
FIG. 10 is a schematic illustrating the computing components that may be used to implement various features of embodiments described in the present disclosure.

FIG. 10 is a block diagram that illustrates a computer system 1000 upon which any embodiments of the vehicle control computer 105 may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. The external sensors 1017 of the vehicle may be coupled to the bus to communicate information on the environment outside the vehicle 152. Similarly, the internal sensors 1020 may be coupled to the bus to communicate information on the passenger(s) inside the vehicle 152. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and maybe originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a component control. A component control local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable component control, satellite component control, or a component control to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution. Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description includes certain embodiments of the present disclosure. It will be appreciated, however, that no matter how detailed the foregoing appears in text, the present disclosure can be practiced in many ways. As is also stated above, it should be noted that the use of particular terminology when describing certain features or aspects of the present disclosure should not be taken to imply that the terminology is being re-defined herein to be restricted to including any specific characteristics of the features or aspects of the present disclosure with which that terminology is associated. The scope of the present disclosure should therefore be construed in accordance with the appended claims and any equivalents thereof.

The various operations of example methods described herein may be performed, at least partially, by one or more processors that are temporarily configured (e.g., by software) or permanently configured to perform the relevant operations. Similarly, the methods described herein may be at least partially processor-implemented, with a particular processor or processors being an example of hardware. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations.

Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the present disclosure has been described in detail for the purpose of illustration based on what is currently considered to be the most practical and preferred implementations, it is to be understood that such detail is solely for that purpose and that the present disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for controlling a vehicle, the method comprising:
   receiving, by the vehicle, a request for a transportation in the vehicle;
   navigating the vehicle with an autonomous control component to a location of an individual to commence the transportation;
   detecting, by one or more sensors, that the individual has entered the vehicle;
   responsive to detecting that the individual has entered the vehicle, changing a vehicle operation mode from an autonomous control component to a hybrid control component;
   determining, while operating under the hybrid control component, whether a rate of change of a steering control exceeds a magnitude;
   in response to determining that the rate of change of the steering control exceeds the magnitude, decreasing a threshold associated with a permitted amount of the change of the steering control, thereby tightening a constraint associated with the steering;
   in response to determining that the rate of change of the steering control is within the magnitude, increasing the threshold, thereby relaxing the constraint;
   determining a proximity of an amount of the change of the steering control to the threshold; and
   applying a resistance, using an actuator, to inhibit the change of the steering control based on the proximity, wherein, for a particular range of values of the change of the steering control, a closer that the change of the steering control is to the threshold, a greater the resistance applied.

2. The method of claim 1, wherein changing the vehicle operation mode from the autonomous control component to the hybrid control component is based on:
   determining that the individual has a valid license to operate the vehicle; and
   receiving a payment from the individual.

3. The method of claim 1, further comprising:
   detecting by one or more sensors, that the individual has exited the vehicle; and
   changing the vehicle from a hybrid control component to an autonomous control component.

4. The method of claim 1, further comprising:
   acquiring data from one or more external sensors on the vehicle regarding one or more conditions outside the vehicle;
   determining a range of allowable actions for the vehicle based on the data from the one or more external sensors;
   limiting actions available to the individual while navigating with the hybrid control component to the range of allowable actions.

5. The method of claim 4, wherein the range of allowable actions comprises a limit on at least one of, a rotation of a steering wheel, an acceleration of the vehicle, or a deceleration of the vehicle.

6. The method of claim 4, wherein determining the range of allowable actions for the vehicle is further based on payment received the individual.

7. The method of claim 4, wherein the hybrid control component further comprises providing instructions to the individual to stay within the range of allowable actions.

8. The method of claim 5, wherein for the particular range of values of the change of the steering control, the resistance is applied, and outside of the particular range of values, the resistance is removed.

9. A method of claim 8, wherein the resistance is applied to the rotation of the steering wheel if the proximity of the steering wheel is about 20 degrees from the rotation limit.

10. The method of claim 1, wherein the threshold indicates a permitted turn radius.

11. The method of claim 1, further comprising, in response to determining that the rate of change of the steering control exceeds the magnitude, restricting a number of times that the vehicle is permitted to unintentionally swerve into an adjacent lane.

12. A vehicle comprising:
   a computer with an autonomous control component operation mode configured to control substantially all features of the vehicle;
   a component configured to receive a request by an individual and navigate to a location of the individual;
   one or more sensors configured to detect that the individual has entered the vehicle;
   wherein the computer is configured to change operation mode from the autonomous control component to a hybrid control component based on detecting that the individual has entered the vehicle; and
   wherein the hybrid control component is configured to:
      determine whether a rate of change of a steering control exceeds a magnitude;
      in response to determining that the rate of change of the steering control exceeds the magnitude, decreasing a threshold associated with a permitted amount of the change of the steering control, thereby tightening a constraint associated with the steering control;

in response to determining that the rate of change of the steering control is within the magnitude, increasing the threshold, thereby relaxing the constraint;

determining a proximity of an amount of the change of the steering control to the threshold; and applying a resistance, using an actuator, to inhibit the change of the steering control based on the proximity, wherein, for a particular range of values of the change of the steering control, a closer that the change of the steering control is to the threshold, a greater the resistance applied.

13. The vehicle of claim 12, wherein the computer is further configured to change operation mode from the autonomous control component to the hybrid control component, responsive to at least one of:

determining that the individual has a valid license to operate the vehicle determining that the individual paid the vehicle;

determining that the individual audibly asked to have control of the vehicle; or the individual activating an internal user control.

14. The vehicle of claim 10, further comprising one or more external sensors configured to determine a range of allowable actions for the vehicle;

wherein the hybrid control component limits vehicle controls to the range of allowable actions.

15. The vehicle of claim 14, wherein the range of allowable actions comprises a limit on at least one of, a rotation of a steering wheel, an acceleration of the vehicle, or a deceleration of the vehicle.

16. The vehicle of claim 14, wherein the computer is configured to modify the range of allowable actions for the vehicle based on a payment received from the individual.

17. A non-transitory computer readable storage medium in a vehicle having data stored therein representing software executable by a computer, the software comprising instructions that, when executed, cause the vehicle to perform:

receiving a request for a transportation in the vehicle;

navigating with an autonomous control component operation mode to a location of an individual to commence the transportation;

detecting, by one or more sensors, that the individual has entered the vehicle;

responsive to detecting that the individual has entered the vehicle, changing the vehicle operation mode from an autonomous control component to a hybrid control component, wherein the hybrid control component comprises:

determining whether a rate of change of a steering control exceeds a magnitude;

in response to determining that the rate of change of the steering control exceeds the magnitude, decreasing a threshold associated with a permitted amount of the change of the steering control, thereby tightening a constraint associated with the steering control;

in response to determining that the rate of change of the steering control is within the magnitude, increasing the threshold, thereby relaxing the constraint;

determining a proximity of an amount of the change of the steering control to the threshold; and applying a resistance, using an actuator, to inhibit the change of the steering control based on the proximity, wherein, for a particular range of values of the change of the steering control, a closer that the change of the steering control is to the threshold, a greater the resistance applied.

18. The non-transitory computer readable storage medium in a vehicle of claim 17, further comprising:

acquiring data from one or more external sensors on the vehicle regarding one or more conditions outside the vehicle;

determining a range of allowable actions for the vehicle based on the data from one or more external sensors;

limiting actions available to the individual while navigating with the hybrid control component are limited to the range of allowable actions.

19. The non-transitory computer readable storage medium in a vehicle of claim 18, wherein the range of allowable actions comprises a limit on at least one of, a rotation of a steering wheel, an acceleration of the vehicle, or a deceleration of the vehicle.

20. The non-transitory computer readable storage medium in a vehicle of claim 19, wherein the limit on the rotation of the steering wheel further comprises:

determining a proximity of the rotation of the steering wheel to the limit of the range of allowable actions;

wherein allowing the individual to control one or more vehicle control features further comprises applying a resistance to the rotation of the steering wheel based on the determined proximity.

\* \* \* \* \*